Feb. 23, 1937.  W. SCHAELCHLIN  2,071,855
SHIP PROPULSION STABILITY CONTROL
Filed Nov. 29, 1935  2 Sheets-Sheet 1

WITNESSES:
C. J. Weller.

INVENTOR
Walter Schaelchlin.
BY Paul E. Friedemann
ATTORNEY

Feb. 23, 1937.    W. SCHAELCHLIN    2,071,855
SHIP PROPULSION STABILITY CONTROL
Filed Nov. 29, 1935    2 Sheets-Sheet 2
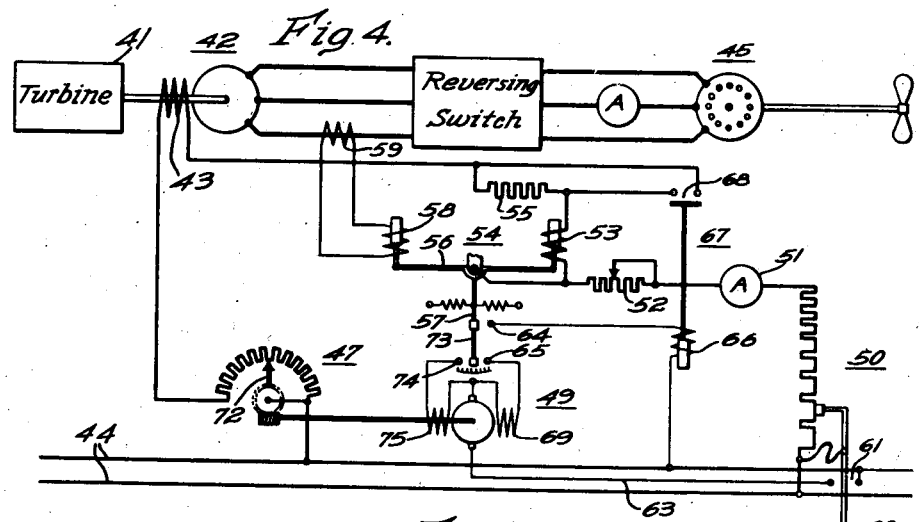
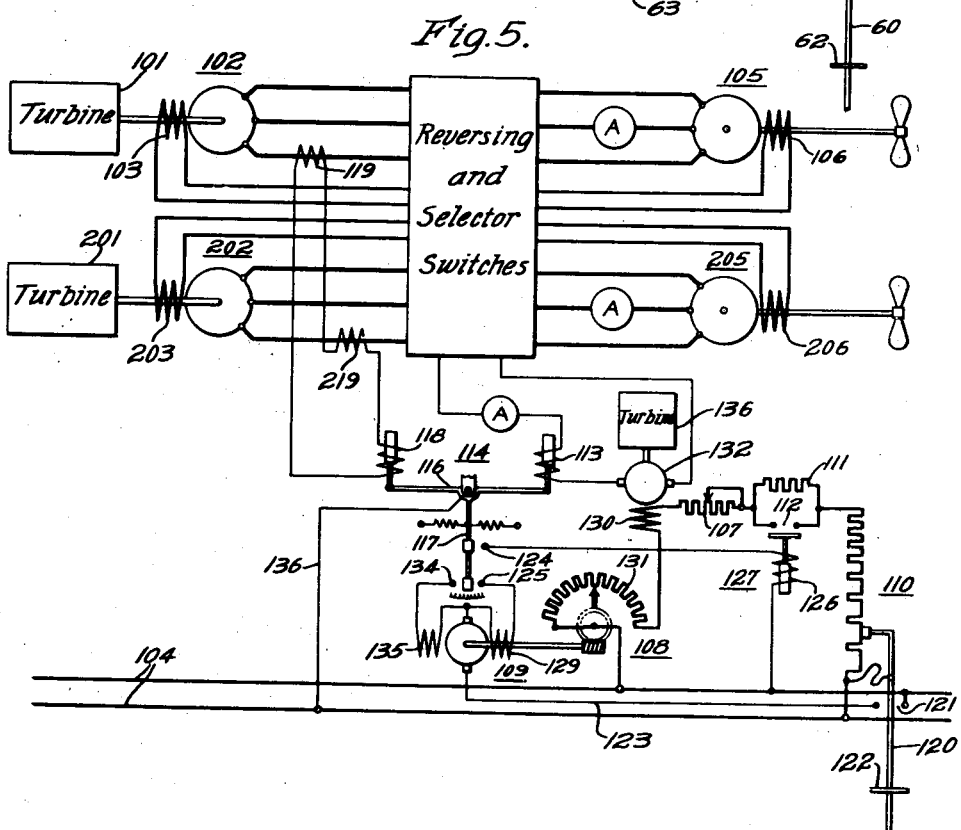
WITNESSES:
INVENTOR
Walter Schaelchlin.
BY
ATTORNEY Patented Feb. 23, 1937

2,071,855

UNITED STATES PATENT OFFICE 2,071,855

SHIP PROPULSION STABILITY CONTROL

Walter Schaelchlin, Wilkinsburg, Pa., assignor to Westinghouse Electric & Manufacturing Company, East Pittsburgh, Pa., a corporation of Pennsylvania Application November 29, 1935, Serial No. 52,144

11 Claims. (Cl. 172—8)

My invention relates to stability indicating and controlling means, and more particularly to means for indicating and for automatically controlling the stability of a generator and a motor, or of one or more generators selectively interconnected with one or more motors.

It is a broad object of my invention to provide simple and efficient means for controlling the stability of interconnected dynamo-electric machines.

In power systems where a motor is connected to a generator and the capacity of the motor is somewhere near that of the generator, any variations of load on the motor may very materially change the voltage of the generator. Furthermore, for a constant excitation of the generator, the load variations on the motor may cause the motor to pull out of step or out of synchronism if the motor be a synchronous motor, or to drop its load if the motor be an insynchronism if the motor be a synchronous motor pull out of step, or drop its load, is particularly great whenever the generator is operated at a variable speed as is the case in ship propulsion systems and whenever a variable speed turbine drives the generator, and the speed of the motor is determined by the frequency of the supply of the generator.

It is very important to know when the operation of the motor approaches the point where it might drop out of synchronism or drop its load; namely, it is important to know the stability of the system. Furthermore, if the excitation, or field current, of the generator or the motor, or both, can be made a function of the load and the field current itself, a substantially constant stability can be maintained.

A cursory consideration would seem to indicate that if the excitation currents for both the generator and the motor be kept high enough, an appropriate stability would be maintained regardless of voltage and frequency variations, but such operation is far from desirable.

In ship propulsion the torque variations are, of course, quite considerable and if both motor and generator for normal excitation are chosen of a size such that "pull out" is not to occur, the dynamo-electric machines will operate at maximum efficiency only at maximum torque. At normal torques and also at low torques the efficiency of the machines would be low, which means that the propulsion system would be operating at low efficiency most of the time. Furthermore, the rating of such machines would have to be about 25 to 35% greater than would otherwise be required.

Not only is it a great objection that the rating would have to be larger but such higher rated machines cost considerably more, weigh much more, and take up much more space.

One of the objects of my invention is the provision of a generator motor system for a given requirement that is of minimum weight and will, by the use of my control means, operate at substantially constant stability.

It is, of course, known that a generator motor system of minimum weight for a given requirement can be made to operate stably if the field currents of both generator and motor are kept high enough but such is not a desirable operation because if the motor and generator are to be operated to be stable for all variations in load, the efficiency of the system is very much impaired. Such operation as has already been intimated, would necessitate a heavy excitation of the generator field, and, if a synchronous motor be used, a heavy excitation for both the generator field and the motor field would be necessary. It is thus desirable that the motor be operated at some point near its pull-out condition and yet not sufficiently near that point to involve dangerous operation.

One object of my invention is to so control the excitation of a motor and a generator in a generator motor system that a substantially constant stability of the system is maintained.

Another object of my invention is to so control the excitation of a motor and the voltage of a generator supplying energy to the motor that substantially constant stability is maintained.

Another object of my invention is to so control a generator and a motor that the pull-out torque is maintained above the load torque by a small fraction of the load torque.

A further object of my invention is to so control a generator and a motor that the pull-out torque is maintained above the load torque by a small fraction of load torque, for the slightly below normal, the normal, and the high loads and is maintained above the load torque by a larger fraction of the load torque for small loads.

It is also an object of my invention to so control the excitation of one or more generators with reference to the load on the generators that the motor or motors, as the case may be, will not drop the load.

Another object of my invention is to so control the excitation of the generating means of a system in relation to the load on such means that the pull-out torque of motor means connected in the system is maintained a small fraction of the load torque above the load torque.

A still further object of my invention is the provision of means for maintaining substantially constant stability of operation of an interconnected generator and motor by a measure of the excitation of either one, or both machines, in relation to the load on the motor.

Other objects and advantages of my invention not hereinbefore specifically recited but resulting from it and constituting contributions to the art made by this invention, will become more apparent from a study of the following detailed specification when considered in conjunction with the drawings accompanying the specification, in which:

Fig. 4 is a diagrammatic showing of a power system for electric ship propulsion utilizing an induction propeller driving motor coupled to a synchronous generator; and Fig. 5 is a diagrammatic showing of a plurality of generators and a plurality of motors which may be selectively interconnected by the use of selector switches and reversing switches, provided with my system of control.

Figure 1:
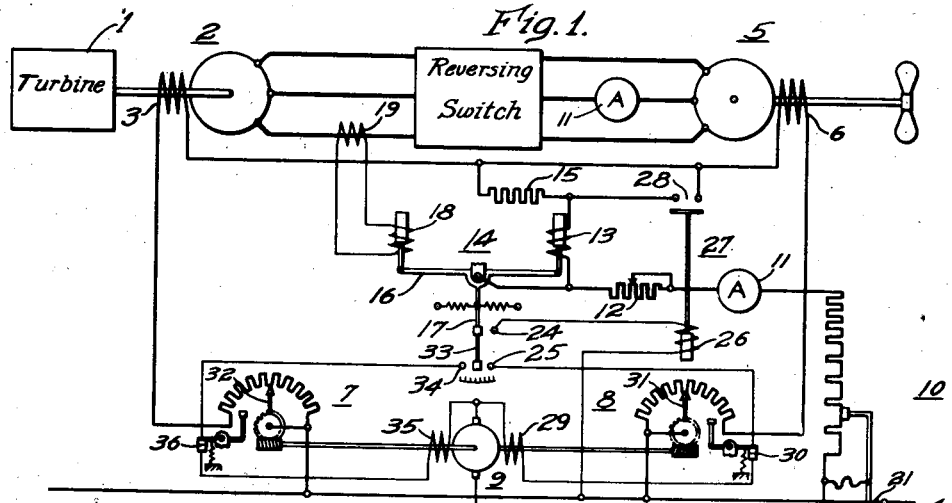
Figure 1 is a diagrammatic showing of an embodiment of my invention.
Figure 2:
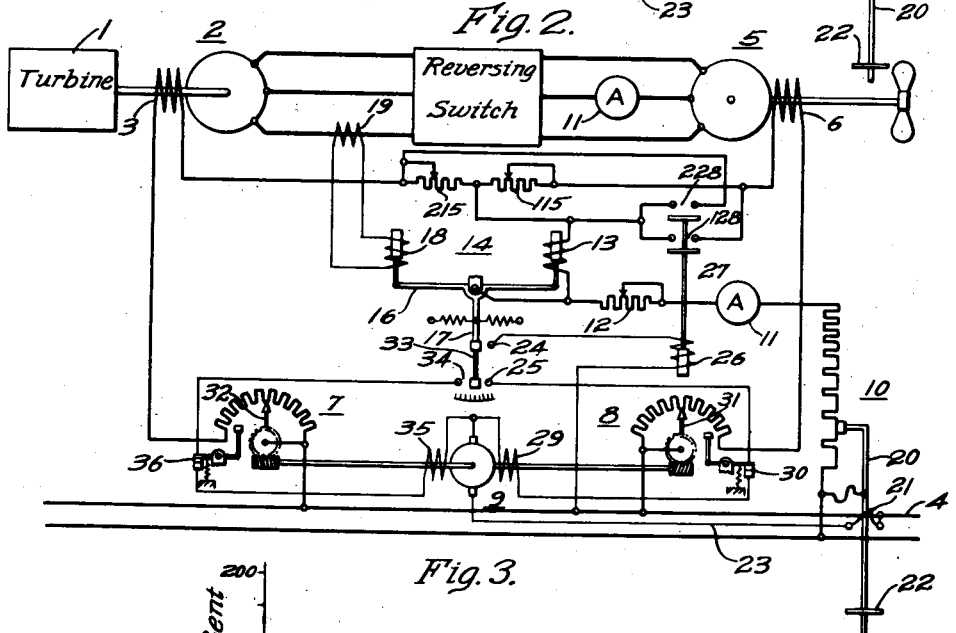
Fig. 2 is a diagrammatic showing of a modification of my invention.

Referring more particularly to Figs. 1 and 2 of the drawings, the reference character 1 designates a variable speed prime mover and may be considered a schematic showing of a turbine. In ship propulsion systems it is of course a usual method of varying the speed of the ship by varying the admission of steam to the turbine to suit the operating condition of the system. A synchronous generator or alternator 2 is coupled to the turbine 1 and generates an alternating current having a frequency determined by the speed of the turbine. The generator is provided with a field winding 3 which is interconnected with a source of direct current, designated by the bus bars 4, in a manner explained more in detail hereinafter.

A propeller driving motor 5 is electrically connected to the generator through the indicated reversing switch, whereby the direction of rotation of the propeller driving motor may be selected at will. The motor is shown as a synchronous motor and is thus provided with a field winding 6.

A pair of rheostats 7 and 8 are motor operated and in order that the field current in both the motor as well as the generator may be raised, or lowered, as the case may be, and as desired, the rheostats are mechanically coupled to a motor 9. Motor 9 has a pair of field windings 29 and 35 whereby it may be caused to operate in one or the other direction by the stability controlling device described hereinafter.

The field windings 3 and 6, Fig. 1, are connected to the bus bars 4 through the bar or speed lever 20 of the manually operable rheostat 10, by the circuit through a field current measuring ammeter 11, a current adjusting resistor 12, coil 13 of the stability control device 14, a control resistor 15, the two field windings 3 and 6 and motor operated rheostats 7 and 8, connected in parallel, back to the bus bars 4.

To properly control the stability of the system a stability control device 14 is provided which includes a spring balanced lever 16, held in a given balanced position by a pair of springs acting on the contact carrying arm 17 of lever 16 in the manner shown. The lever is also provided with a pair of armatures which are disposed to be acted upon by solenoids or coils 18 and 13, respectively. Coil 18 is connected directly in circuit with a current transformer 19 and is thus energized proportional to the load current of the motor 5.

Coil 13 is connected in circuit relation with both the field windings 3 and 6 of the generator and the motor, respectively, and is thus energized in such a manner that the magnetic action of coil 13 is directly responsive to the excitation of the generator and the motor. The circuit for coil 13 is, of course, the circuit traced generally heretofore for the field windings 3 and 6.

As heretofore explained, the effect of coil 13 upon the armature associated therewith is substantially directly proportional to the excitation in the field windings 5 and 6. The effect of coil 18 on the armature associated therewith is proportional to the load current flowing from the generator to the motor. It is, therefore, obvious that the position of the depending arm 17 of lever 16 will be a function of the motor load and the excitation of the generator and the motor.

As heretofore explained the ratio of the pull-out torque to the load torque determines the stability of the machines and since the ratio of load current to field current is an excellent measure of the torques, the stability control device 14 is an excellent means for controlling stability. By choosing load current in relation to field current a much more accurate and reliable measuring apparatus is secured. It is more accurate than devices heretofore known and used to control stability because my device is not materially affected by frequency variations, voltage variations, etc., variations that are inherently present in electric ship propulsion systems.

A better understanding of my invention can probably be had by a study of the operation of the system. Assuming that resistor 12 has been properly adjusted so that the current in the field windings 3 and 6 can be varied over the desired range for the normal operating range by the manually operable rheostat 10 during starting and for proper control by rheostats 7 and 8 during running.

Arm 20, aside from manually controlling the admission of steam to the turbine 1, in a manner not shown, controls the excitation of the generator and the motor by shunting resistor sections of the rheostat 10.

The characteristics of the field circuits for both generator and motor are so adjusted that these machines are over-excited for the low loads and as the load increases the amount of over-excitation is decreased. The load on the motor will, of course, have some relation to the speed and thus the position of speed lever 20, but it is clear that the rheostat 10 can be designed to produce any variation in excitation desired during a reduced ship speed.

It will be noted that the amount of resistance shunted for a given movement of arm 20 at the higher resistance values in the field circuits is greater than for the lower resistance values. This means that the excitation of both motor and generator will be proportionately higher at the low loads, namely, during reduced ship speed than for the high loads, namely normal loads and overloads and thus normal speeds and high speeds.

Figure 3:
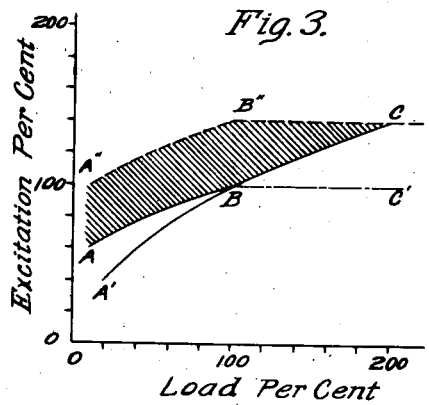
Fig. 3 shows load curves of a generator motor system and by the comparative curves shown illustrates some of the novel features and some of the novel results attained by my invention.

The excitation for the dynamo-electric machines will thus, during reduced ship speed, vary with reference to the load along the curve A—B of Fig. 3. The curve A'—B represents the curve for the variations in excitation if no special provision is made to increase the margin of stability during the lower speeds, that is, during that period when the danger of pull-out is greatest.

When the speed of the ship is decreased, the load will obviously decrease and the variation in excitation, for an increased margin of stability, will follow the curve A—B from B to A.

During such lower speeds of the ship the load will normally be low, and the stability control device 14 need not be in operation at all. Furthermore, the excitation control as heretofore explained will be such that the margin of stability will be great. Any rapid speed variations below point B thus produce no pull-out. To secure an electrical system of control for a ship of minimum weight, minimum cost, and minimum space requirements, it is, however, important to control the ratio of pull-out torque to load torque from a load a trifle below normal up to any overload that may occur. With my system of control the pull-out torque is maintained at a small fraction of the load torque above the load torque and at no time does it become equal to or less than the load torque.

During maneuvering and lower ship speeds, the arm 20 will, of course, be shifted but contact fingers 21 will not be bridged by the segment 22. The motor 9 will not be energized and the position of the depending arm 17 will be immaterial.

After the maneuvering is over and it is desired to run at the higher speeds, the contact fingers 21 will have been bridged by the segment 22 and conductor 23 will be energized.

If there be no overload and the equipment be operating normally, the excitation will be at point B, Fig. 3, and arm 17 will be in the position indicated. In the absence of my special stability control device 14, the excitation for greater and greater loads would follow the curve indicated by B—C' which would mean that the pull-out torque would become greater than the load torque and the motor would pull out of synchronism. To increase the excitation in relation to the load so that a substantially predetermined margin of stability is maintained, it is desirable to vary the excitation so that it will follow the curve B—C.

Assuming that the load increases, which means that current in the coil or solenoid 18 is increased and in consequence lever 16 is rotated about its pivot in a counter-clockwise direction. This will happen because the effect of the load on coil 18 is greater than the effect of the excitation on coil 13. The depending arm 17 will thus be brought into engagement with the contact fingers 24 and 25, thereby establishing a circuit from one of the conductors or buses 4 through the coil 26 of the quick excitation control contactor 27, contact finger 24, the depending arm 17, resistor 12, ammeter 11, rheostat 10 to the other conductor of the buses 4. Energization of the coil 26 will cause an immediate operation of the switch 28 with the result that excitation control resistor 15 is shunted and the excitation in the field windings 3 and 6 of the generator 2 and the motor 5, respectively, is immediately increased. This is a very desirable operation, because it prevents the possibility of having the motor pull out of synchronism by reason of a rapid rise in load.

Another circuit is established from the field winding 29, limit switch 30 and contact finger 25 to the energized arm 17. Motor 9 will thus be rotated in such a direction as to decrease the amount of resistance in circuit with the field windings 3 and 6, respectively. In other words, rheostat arm 31 will move in a clockwise direction and rheostat arm 32 will move in a counter-clockwise direction.

The depending arm 17 has a spring support 33 for the contact segment engaging the contact finger 25, so that as the excitation increases and thus the current in the solenoid 13 increases, contact will be broken at contact finger 24 but will remain closed a little longer at contact finger 25 with the result that the motor 9 will remain in operation a trifle longer than the quick excitation control contactor 27. In case the correction effected by one operation of the lever 16 does not suffice, it is, of course, obvious that as the circuit for coil 26 is interrupted, the excitation for the motor and generator may be temporarily decreased sufficiently to reclose the circuit for coil 26. The result is that quick excitation control contactor 27 will vibrate and continue to do so until the motor 9 has varied for the generator and motor sufficiently to provide for the necessary margin of stability. All hunting is thus eliminated.

In case there be a decrease in load, the excitation will, of course, be in excess of that required and in consequence lever 16 will rotate in a clockwise direction about its pivot and contact will be made at contact finger 34. A circuit will thus be established from the conductor 23 through the motor 9, the field winding 35, limit switch 36, contact finger 34 to the energized conductor 17. The motor 9 will thus operate in a direction so as to decrease the excitation in the field windings of both generator and motor. Since it is not necessary to provide for a rapid decrease in excitation during a decrease in load, no contactor corresponding to the contactor 27 need be provided in this system when the load decreases.

The resistance of resistor 15, shown in Fig. 1, is, of course, of a fixed value and is in circuit with both of the field windings 3 and 6. There are, however, installations, as shown in Fig. 2, where the excitation of the field windings of the generator and motor are to have some definite relation and that such relation be adjustable. In such case, the resistor 15 may be replaced by a pair of adjustable resistors 115 and 215 which are in the circuits of field windings 6 and 3, respectively. When contactor 27 operates in such instant, shunting circuits for these resistors are established through switches 128 and 228, respectively. Otherwise, the system shown in Fig. 2 is exactly like the system shown in Fig. 1, except as hereinbefore explained, but for the modification shown in Fig. 2 the adjustment is somewhat more flexible.

My invention is, however, not limited in its use to a system utilizing a synchronous generator and a synchronous motor but is equally useful when utilized with a system wherein the propeller driving motor is an induction motor and a synchronous generator is utilized to supply the alternating current to the induction motor as shown in Fig. 4. In such instance the excitation of the generator alone is balanced against the load current flowing from the generator to the motor and since no field excitation need to be varied for an induction motor, the rheostat motor is designed to operate but one rheostat for varying the excitation of the synchronous generator.

It will be noted that like parts are similarly numbered in Fig. 4 to the numbering appearing in Figs. 1 and 2. It is believed that the detailed explanation of the function of the apparatus shown in Fig. 2 is sufficient for those skilled in the art to determine from a mere inspection of Fig. 4 as to how the apparatus there shown functions.

In Fig. 5 the arrangement is somewhat more complicated since a plurality of generators and a plurality of motors are utilized and connecting means are schematically shown whereby the generators and the motors may be selectively interconnected.

For instance, generator 102 by suitable manipulation of the selector switches may be connected to drive both motors 105 and 205, or both generators 102 and 202 may be connected to drive both motors 105 and 205.

Further, when desired, both generators may be connected to one of the motors, the particular motor selected being determined by the operation of the selector switches. The selector switches, which in themselves constitute no part of my invention in this application and need not be explained in detail, are, however, designed so that all possible selections of the plurality of machines shown may be made. In fact, the selection is such that each generator may drive a corresponding motor without being interconnected with the remaining portions of the system. In such instances, a plurality of regulating devices, such as 114, are utilized, one for each pair of dynamo-electric machines. However, since Fig. 1 shows such an arrangement, it is believed not to be necessary to complicate the showing of Fig. 5 by showing a plurality of regulating devices.

When the connection of the dynamo-electric machines is such that their circuits are interrelated, then the use of a single regulating device, as 114, suffices.

Assume that all of the generators and all of the motors are interconnected so that one regulating device is sufficient to regulate the stability of the system. In such instances, it is, of course, clear that the selector switches will interconnect the field windings in such a way that coil 113 will be energized proportional to the excitation in the respective field windings, and that coil 118 will be energized proportional to the load on the generators.

If the operation of the system is at normal or above normal speed, namely, the operation being such that speed lever 120 of the manually operable speed control and rheostat 110 is shifted forwardly to shunt most of the resistor sections of the manually operable rheostat, then if a variation in load occurs, the regulating device 114 will operate to vary the excitation of the field windings to maintain a substantially constant margin of stability.

In Fig. 5 the excitation controlled is not affected by operating directly on the field circuits of the field windings 103, 106, 203 and 206, but the motor 109, when connected in circuit relation to operate, operates a rheostat 108 which controls the excitation of the field winding 130 of an exciter 132 driven by a substantially constant speed prime mover 136 which may be a turbine.

If the load increases on the generators 102 and 202, as it will when it is desired to increase the speed of the ship by admitting more steam to the turbines 101 and 201, then the combined effect of transformers 119 and 219 on coil 118 will cause the pivoted lever 116 to be rotated about its pivot in a counter-clockwise direction. As the depending arm 117 engages contact fingers 124 and 125, a pair of circuits are established which change the excitation of the field winding 130 and in consequence correspondingly increase the excitation on the field windings of the main dynamo-electric machines.

Completing of the circuit through contact fingers 124 energizes coil 126 of the rapid excitation control contactor 127, thereby closing the switches 112 to thus shunt the excitation control resistor 111. The circuit for the field winding 130 will thus be established from the lower bus 104 through the arm 120, a small portion of the resistor or rheostat 110, the shunt through switch 112, excitation control resistor 107, field winding 130, rheostat 108, back to the bus 104.

Completing a circuit at the contact fingers 125 establishes a circuit from the upper bus 104 through contact fingers 121 bridged by the segment 122, conductor 123, motor 109, field winding 129, contact finger 125, depending arm 117, and conductor 136 to the lower bus 104. The motor 109 will thus move rheostat arm 131 in a clockwise direction to shunt more and more resistor sections to thus increase the excitation.

As the excitation is increased contact may be broken at 124 and resistor 111 may thus be placed in the field circuit temporarily. However, as the excitation tends to decrease, contact is again made at 124 and the shunt is immediately reestablished at 112. The result is that the excitation on field winding 113 is immediately increased when there be an increase of load, and the motor 109 slowly decreases the resistance in the field winding 130 without being subjected to hunting because when a sufficient amount of resistance has been shunted by the rheostat 108, then the shunt for resistor 111 will be removed and the depending arm 117 will be in the position shown.

Variation of the excitation in the field winding 130 obviously varies the voltage of the exciter 132 and thus varies the excitation of the field windings of the generators and the motors. Since coil 113 is connected in the armature circuit of the exciter 132, it will be energized proportional to the excitation in the field windings, with the result that as the excitation in the field windings of the generators and motors is increased, the effect of coil 113 will balance the effect of coil 118 to thus position the depending arm 117 in the position shown, as heretofore explained. The position of the arm 117 with reference to the adjacent graduations is, of course, also an indication of the stability of the system. Depending arms 73, Fig. 4, and 17, Figs. 1 and 2, similarly coact with graduations.

My special contribution to the art thus provides systems of control where the excitation during maneuvering and acceleration of the dynamo-electric machine varies from A to B and during normal operation when the device may be overloaded from B to C and does not vary from A' to B and from B to C'.

The curve A'', B'', C represents the variations in excitation that would be required to maintain stable operation without the use of my stability control system and shows that much larger machines would be necessary to get the excitation needed. If smaller machines are used the excitation would have to be excessive. In fact, smaller machines comparable to the size machines that can be used with my system of control could not be used because if the fields were continuously so overexcited as to maintain stable operation for all loads, it is clear that the windings would soon heat up to such a point as to break down the insulation and thus cause a complete failure of the system.

It will be noted that the motor operated rheostats, Fig. 1, are provided with limit switches 30 and 36, respectively, so that regardless of the direction in which the field excitation is varied, the motor 9 will be stopped if the limit of operation of the respective rheostats 7 and 8 is obtained. Hence, if arm 32, for instance, is moved in a counter-clockwise direction a sufficient amount, limit switch 36 opens to stop the motor 9, whereas on the other hand, if the rheostat arm 31 of rheostat 8 is moved in a clockwise direction a sufficient amount, limit switch 30 stops motor 9.

It is to be understood that the modifications herein described are merely illustrative of this invention and that other circuit arrangements may be readily devised by those skilled in the art once they have had the benefit of the teachings of this invention, to accomplish the results hereinbefore specified and hereinafter claimed.

For instance, I have shown the motor 9 as operating on rheostats connected directly in the respective circuits of the field windings, but it is obvious that the generator may have a separate exciter and the motor may have a separate exciter and that a pilot exciter controlling the field excitation of the generator exciter and the motor exciter may have its voltage controlled by an apparatus such as is indicated by reference character 14. The contactor such as 27 would also merely shunt a definite amount of the resistance in the pilot exciter field circuit to thus cause a rapid boost in the generator and motor excitation when an overload occurs on the motor.

I claim as my invention:

1. In a system of control for a pair of synchronous alternating current dynamo electric machines, the combination of, excitation adjusting means for said machines and control means, responsive to the load current of one machine and the excitation current of either machine, adapted to so control the excitation of both machines that the synchronous operation of the machines is maintained regardless of load variations on one machine.

2. In a system of control for a pair of synchronous alternating current dynamo electric machines, comprising a synchronous generator, a synchronous motor, an excitation adjusting means for said generator and motor, control means responsive to the load of the generator and the excitation of both generator and motor to at all times maintain the excitation of both the generator and the motor sufficiently high to ensure synchronous operation of said machines.

3. In an electric system, an alternator driven at varying speeds, a motor load supplied thereby, and means responsive to the quantity $$\frac{I_a}{I_f}$$

for indicating stability of the motor load, where $I_a$ is the armature current flowing from the alternator to the motor and $I_f$ is the field current of the alternator.

4. In an electric system, an alternator driven at varying speeds, a synchronous motor load supplied thereby, and means responsive to the quantity $$\frac{I_a}{I_f}$$

for indicating stability of the system, and where $I_a$ is the armature current of the alternator and $I_f$ is the total field current of the alternator and motor.

5. In an electric system, an alternator driven at varying speeds, a motor load supplied thereby, control means responsive to the quantity $$\frac{I_a}{I_f}$$

for controlling the stability of the system and where $I_a$ is the armature current of the alternator and $I_f$ is the field current of the alternator, and means, responsive to the operation of the control means, adapted to vary the excitation of the alternator to thus control the margin of stability with variations of $I_a$.

6. In a system of control for a plurality of synchronous alternating current dynamo electric machines, the combination of, excitation adjusting means for said machines and control means, responsive to the load current of said machines and the excitation current of said machines, adapted to so control the excitation of said machines that synchronous operation of the machines is maintained regardless of variations of load of the machines.

7. In a system of control for a pair of alternating current dynamo electric machines, in combination, one of said machines comprising an alternating current synchronous generator, the other of said machines comprising an induction motor, excitation adjusting means for the generator, means for driving the generator by a prime mover, the speed of which may be varied, said excitation adjusting means including means responsive to the load current flowing from the generator to the motor and also responsive to the excitation current of the generator, and adapted to control the excitation of the generator so that the motor will not drop its load regardless of the variations of the load current of the motor.

8. In an electric system, a synchronous alternator driven at varying speeds, a motor load, comprising a synchronous motor supplied thereby, control means responsive to the quantity $$\frac{I_a}{I_f}$$

for controlling the stability of the system and where $I_a$ is the armature current of the alternator and $I_f$ is the total field current of both alternator and motor, and means, responsive to the operation of the control means, adapted to vary the excitation of both the alternator and the motor so that the ratio of $$\frac{I_a}{I_f}$$

remains substantially constant regardless of the variations of $I_a$.

9. In combination with an instrument, a circuit having a varying electric current flowing therein and including a coil responsive to the varying current flowing in said circuit, a second circuit for carrying an electric current including a coil responsive to the current flowing in said second circuit, means, operable by the relative effect of said coil, adapted to vary the current flowing in said second circuit so that the ratio of the current flowing in the first circuit to the current flowing in the second circuit is always greater than unity by a small fraction of unity.

10. In an electric system, a pair of dynamo electric machines, means for interconnecting said machines, and means responsive to the quantity $$\frac{I_a}{I_f}$$

for indicating stability of operation of said machines, where $I_a$ is the current flowing from one machine to the other and $I_f$ is the field current of one of said machines.

11. In an electric system, in combination, an instrument comprising a pivoted member, a coil for moving said member about its pivot in one direction, a second coil for moving said pivoted member about its pivot in another direction, a circuit energized in such a manner that the current flowing therein varies over a considerable range, means for energizing the first mentioned coil in response to the current variations in said circuit, a second circuit interconnected with the second coil, resilient means for holding the pivoted member in a given position when the ratio of the currents in the first and second coils is greater than unity by a small fraction of unity, and means operable by said pivoted member to vary the current in the second coil with variations of current in the first coil so that the ratio of the currents in the coils remains substantially constant.

WALTER SCHAELCHLIN.